United States Patent [19]
Lee

[11] Patent Number: 5,979,100
[45] Date of Patent: Nov. 9, 1999

[54] CAST NET HAVING EASILY REPLACEABLE BRAILS

[76] Inventor: San Fu Lee, 586 Cypress La., Lutz, Fla. 33549

[21] Appl. No.: 08/998,798

[22] Filed: Dec. 29, 1997

[51] Int. Cl.⁶ .................................................... A01K 73/00
[52] U.S. Cl. ...................................................................... 43/8
[58] Field of Search ................................ 43/8, 14, 11, 12, 43/7

[56] References Cited

U.S. PATENT DOCUMENTS

| | | |
|---|---|---|
| 1,154,563 | 9/1915 | Dorsey . |
| 2,723,481 | 11/1955 | Schwartz, Sr. ................................. 43/7 |
| 4,790,098 | 12/1988 | Lu ................................................. 43/7 |

Primary Examiner—Jack Lavinder
Attorney, Agent, or Firm—Ronald E. Smith

[57] ABSTRACT

An improvement in cast nets includes a first ring to which a throw rope is releasably attached and a second ring that is interconnected to the first ring by a housing that allows the rings to swivel independently with respect to one another. The second ring is releasably attached to a semicircular handle that is attached to an apertured flat disc. Each brail has an uppermost end that extends through an aperture in the disc and which is knotted so that it cannot fall back through the aperture. An annular ring is releasably attached to the flat disc and overlies the knots to prevent axial travel of the brails. The rotational connection between the rings facilitates throwing the net, and the connection of the top end of the brails to the apertured disc inhibits tangling of the brails with one another and facilitates replacement of broken brails.

5 Claims, 3 Drawing Sheets

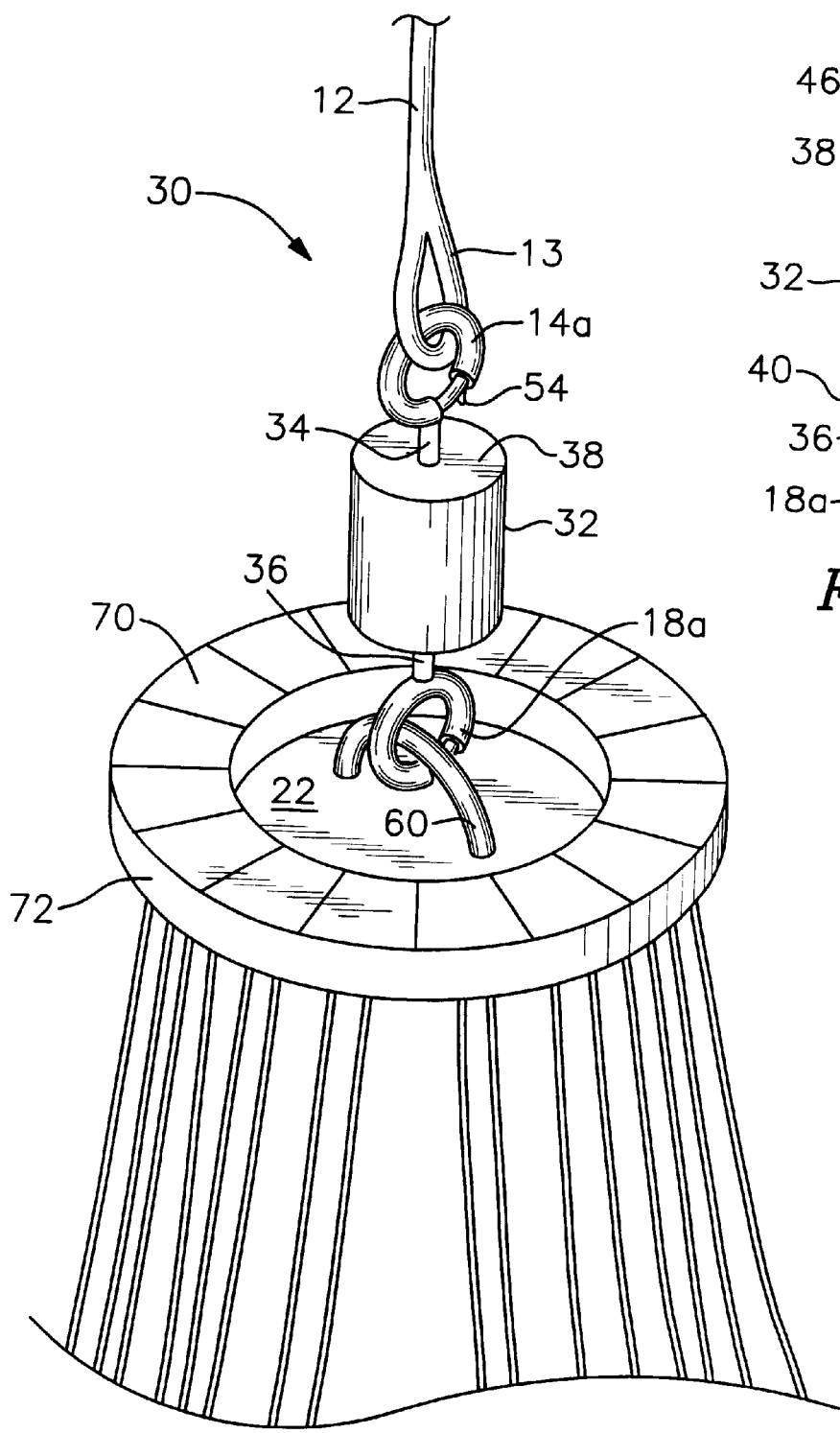
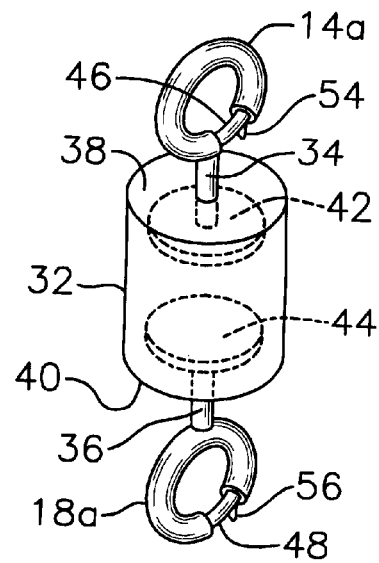
Fig. 2A
Fig. 2

CAST NET HAVING EASILY REPLACEABLE BRAILS

BACKGROUND OF THE INVENTION

1. Field of the Invention

This invention relates, generally, to cast nets. More particularly, it relates to a cast net having a structure that opens easily and that facilitates replacement of broken brails.

2. Description of the Prior Art

Cast nets are small, hand-thrown nets that have a round circumference when properly thrown. A plurality of small weights are secured to the outer periphery of the net, in circumferentially spaced relation to one another. Thus, as the net sinks under the influence of such weights, fish beneath the net are trapped. When the cast net is hauled in, the weights converge toward one another so that the fish cannot escape.

In the most commonly used type of cast net, a first end of an elongate rope is secured around a wrist of the individual throwing the net. The rope is coiled and held in the throwing hand; thus, the rope is rapidly uncoiled when the net is thrown. The second end of the rope is typically secured to the top ring of a two ring swivel member. A large number of draw strings, known in the industry as brails, are looped over the bottom ring of the swivel member, at their respective mid-points, and terminate at the outer periphery of the cast net, i.e., the opposite ends of said brails are secured to the same peripheral edge of the cast net to which the above-mentioned weights are attached. Typically, twine is used to whip the brails together just below the second ring.

There are several problems with the well-known construction just described. The brails are easily tangled around one another in the region between the swivel member and the main body of the net, and when they are tangled they prevent the draw line from fully extending. A greater problem arises, however, when a brail breaks. It requires considerable time and effort to cut off the whipped twine to gain access to the brails, to replace the brail by extending it through the bottom ring of the swivel member and down to the edge of the nets, and to re-whip the twine again around the brails.

Since the brails are looped over a ring as above-described, they may become uneven when hung-up on an oyster bar, a rock, or other obstacle. If a brail is uneven, i.e., if it is no longer looped over the ring at its half-way point, the cast net will not open evenly. Adjusting a brail that has become uneven requires cutting the twine that whips around the brails, adjusting the uneven brail, and again whipping twine about the brails.

What is needed, then, is a new structure for a casting net that facilitates the replacement of broken brails, the adjusting of uneven brails, and which does not rely on twine for whipping brails into a bundle.

However, in view of the art considered as a whole at the time the present invention was made, it was not obvious to those of ordinary skill in this art how such a structure could be made.

SUMMARY OF THE INVENTION

The longstanding but heretofore unfulfilled need for an apparatus that overcomes the limitations of the prior art is now met by a new, useful, and nonobvious invention. The present invention is an improvement in cast net construction. The improvement includes a first ring that is adapted to releasably engage a preselected end of a rope, a second ring, a flat disc having a plurality of apertures formed therein, and a handle attached to the flat disc. A hollow housing is positioned between the first ring and the second ring, and the first ring is rotatably secured to a first end of the hollow housing and the second ring is rotatably secured to a second end of the hollow housing so that the first and second rings are rotationally secured to the hollow housing independently of one another.

The second ring is adapted to releasably engage the handle member. A knot is tied in each free end of a plurality of cast net brails after the free ends have been threaded through a preselected aperture formed in the flat disc. Each knot has a breadth sufficient to prevent it from passing through its aperture so that each brail is suspended from the flat disc. This construction inhibits tangling of the brails and makes it easier to replace broken brails. The independent rotational mounting of the first and second rings facilitates throwing of said cast net.

The first ring includes a retractively mounted arm that, when retracted, allows the end of the rope to enter into or be withdrawn from the first ring, and the second ring includes a retroactively mounted arm that, when retracted, allows the handle to enter into or be withdrawn from the second ring.

There is one aperture in the flat disc for each brail line in the net; the apertures are arranged in a circular pattern. An annular ring is releasably attachable to the flat disc and overlies the circular pattern of apertures so that the knots are sandwiched between the flat disc and the annular ring. This prevents axial travel of the brails.

It is a primary object of this invention to provide a cast net having a structure that facilitates the replacement of broken brails and the balancing and adjustment of uneven brails.

Another object is to provide a cast net structure that inhibits tangling of brails with one another without relying on the use of twine to whip brails together.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a perspective view of an illustrative embodiment of the novel cast net structure;

FIG. 2A is a perspective view of a detail of FIG. 2, depicting interior parts in phantom lines.

DETAILED DESCRIPTION OF THE PREFERRED EMBODIMENT

Figure 1:
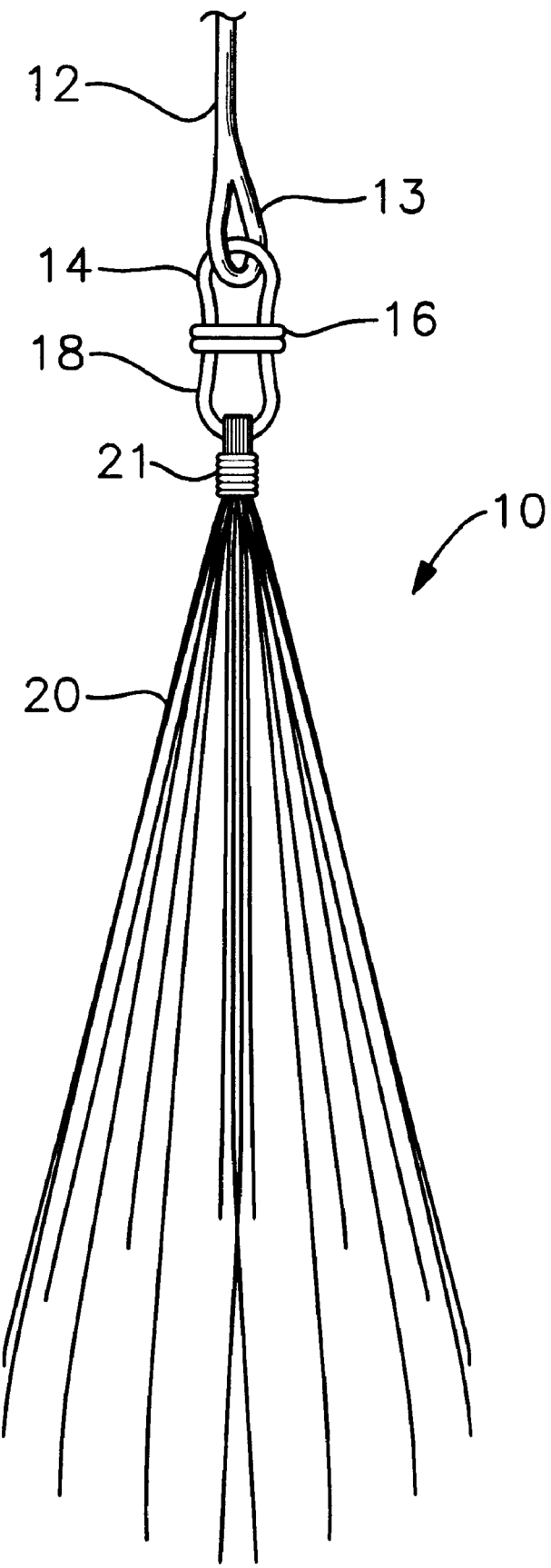
FIG. 1 is a perspective view of a cast net structure of the prior art.

Referring first to FIG. 1, it will there be seen that the pertinent parts of a cast net of the prior art are denoted 10 as a whole. Cast net 10 includes a rope 12 having a first end, not shown, that is loosely secured about the wrist of an individual who throws the net. Second end 13 of rope 12 is looped and secured as illustrated or in some other convenient way to a first part 14 that is the upper part in a two part swivel member. First or upper part 14 is connected by a swivel means 16 to a second or lower part 18, and a plurality of brails, collectively denoted 20, are wrapped over said second ring at their respective mid-length points. Twine 21 is whipped around the brails at a point just below the lower part 18, in the well-known way. The opposite ends of each brail extends to the bottom or outer periphery, not shown, of the main body of the cast net.

The throwing action often results in tangled brails and a net that will not fully open. Moreover, broken brails are hard to replace and uneven brails are hard to balance and adjust. Brail replacement or adjustment requires cutting twine 21 and then re-whipping the twine around the brails to restore the net to its useful configuration.

Referring now to FIGS. 2 and 2A, it will there be seen that an exemplary embodiment of the invention is denoted as a whole by the reference numeral 30.

First and second rings 14a, 18a are interconnected to one another by a rigid hollow housing 32. Each ring 14a, 18a has an integrally formed neck 34, 36, respectively, that extends through an opening formed in the top and bottom walls 38, 40, of said housing, respectively. A disc or other retention means 42, 44, formed integrally with its associated neck 34, 36, is positioned within the hollow interior of housing 32 and is free to rotate therewithin.

Each ring 14a, 18a is further provided with a gate means so that an article may be inserted into or withdrawn from the confines of the ring when the gate means is open, and retained therewithin when the gate means is closed. More particularly (see FIG. 2A), the gate means includes a slideably mounted arm 46, 48 that is retractively received within its associated hollow ring 14a, 18a when an internal bias means, not shown, is loaded by manually displacing handle 54, 56 in the direction required to open the interior of said rings 14a, 18a. Releasing handle 54, 56 unloads said respective springs and arm 46, 48 resumes its position of repose, closing the gate means. In this way, it is a simple matter to secure the free end 13 of rope 12 to first ring 14a.

A semicircular handle 60 is secured to flat disc 22 of this embodiment; said handle 60 is admitted into the confines of second ring 18a when arm 48 is retracted and is retained within said second ring when said arm resumes its position of repose. Due to its semicircular shape, handle 60 is self-centering with respect to said second ring 18a. In sharp and distinctive contrast to the cast net constructions heretofore known, no brails are connected to second ring 18a. This eliminates entanglements of the brails in the region between ring 18 and the net as depicted in FIG. 1.

Figure 3:
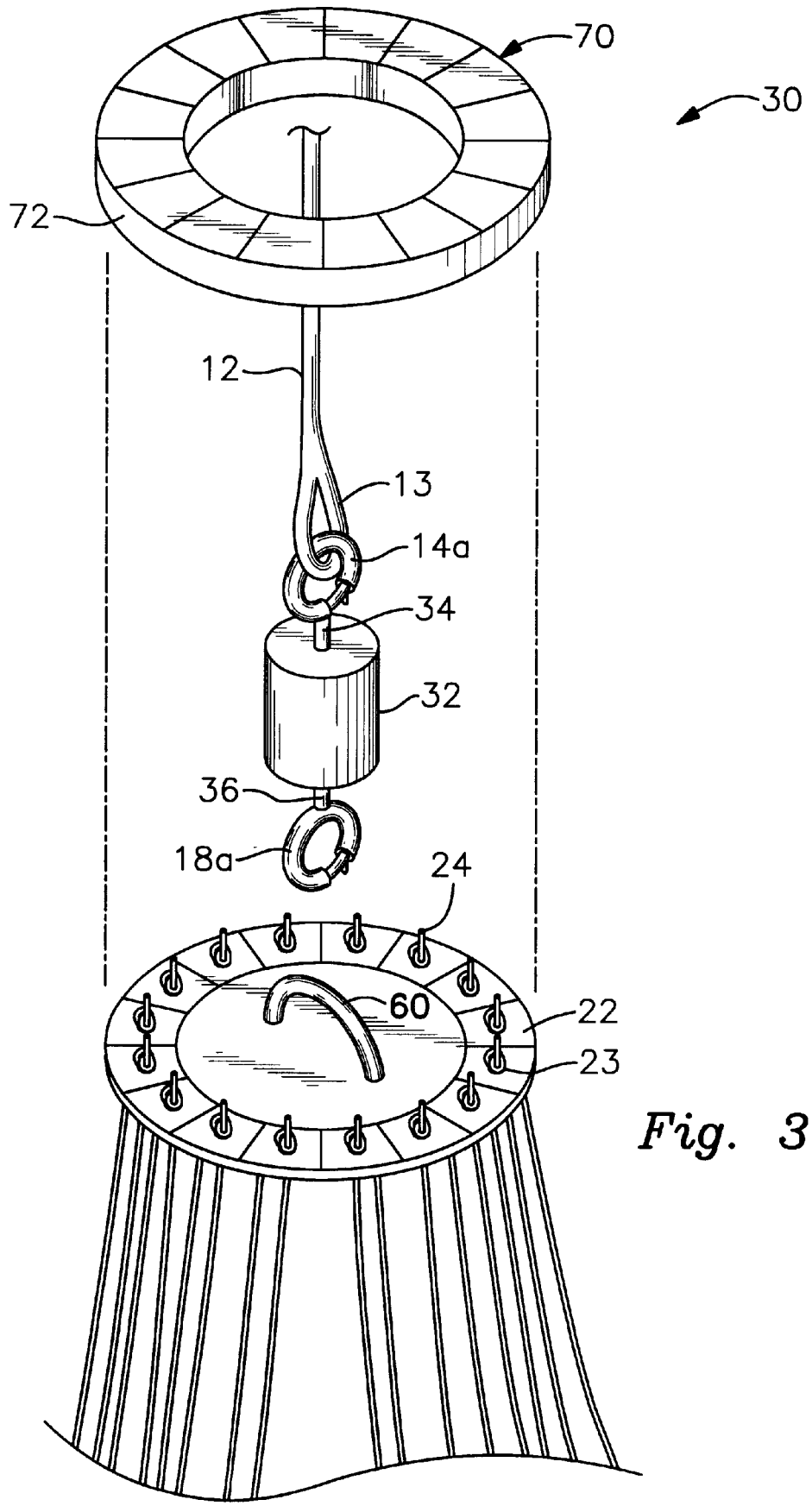
FIG. 3 is a partially exploded perspective view of the parts depicted in FIG. 2.

As depicted in FIG. 3, a plurality of small apertures, collectively denoted 23, are formed in flat disc 22. To secure a brail to said flat disc, the uppermost end of the brail is passed through an aperture, and a knot 24 is tied in said uppermost end. The breadth of the knot is selected so that it exceeds the diameter of the aperture 21 formed in flat disc 22 so that the knot cannot pass through said aperture. Accordingly, each brail hangs independently from flat disc 22 as depicted in FIGS. 2 and 3. As in the known cast net structures, the unillustrated opposite end of each brail is secured to the weighted ring at the lowermost end of the main body of the cast net. Therefore, when a brail breaks, it is a simple matter to install a new brail by simply threading a new brail 20 through an aperture 21 formed in flat disc 22, tying a knot 24 as aforesaid, and attaching the lowermost end of the brail to the weighted ring. As those skilled in the art of cast nets will appreciate, this simple procedure can be performed in the field quickly. This is in sharp contrast to the more complex, more time-consuming procedure of the prior art because there is no twine to cut and to re-whip around the brails. Also, the brails are not looped over ring 18a and thus cannot become unbalanced if snagged by an oyster bar or the like.

Although not essential, an imperforate annular ring or cap 70 may be snap fit, press fit, or otherwise secured over flat disc 22 to prevent upward travel of the knots. More particularly, an annular skirt 72, formed integrally with cap 70, releasably engages the outer periphery of flat disc 22 to hold said cap into overlying relation to said knots. As suggested by the exploded view of FIG. 3, cap 70, if used, is snap fit or press fit onto disc 22 only after all knots 24 have been tied. It is a simple matter to remove cap 70 if a brail 20 requires replacement.

This novel construction provides a cast net that does not tangle easily and which is quickly repairable in the field.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An improvement in cast nets, comprising:

a first ring member adapted to releasably engage a preselected end of a rope;

a second ring member;

a flat disc member having a plurality of apertures formed therein;

each of said apertures adapted to slideably receive therethrough a single brail;

each of said apertures having a predetermined breadth less than a breadth of a knot formed in an uppermost end of each of said brails, each knot having a breadth sufficient to prevent it from passing through its aperture so that each brail is independently suspended from said flat disc member;

a cap means in the form of an annular ring disposed in overlying relation to said flat disc member and to said knots, said cap means being releasably attachable to said flat disc and said cap means operative to prevent upward travel of said brails when a cast net is thrown;

a handle member attached to said flat disc member, centrally thereof;

said second ring member adapted to releasably engage said handle member;

a swivel means positioned between said first ring member and said second ring member, said first ring member being rotatably secured to said swivel means at a first end thereof and said second ring member being rotatably secured to said swivel means at a second end thereof so that said first and second ring members are rotationally secured to said swivel member independently of one another;

whereby tangling of said brails with one another is minimized;

whereby replacement of a broken brail is facilitated;

whereby the independent rotational mounting of said first and second ring members facilitates throwing of said cast net.

2. The improvement of claim 1, wherein said first ring member includes a retractively mounted arm that, when retracted, opens said first ring member to admit said preselected end of said rope thereinto or to allow said preselected end of said rope to be withdrawn therefrom.

3. The improvement of claim 1, wherein said second ring member includes a retractively mounted arm that, when retracted, opens said second ring member to admit said handle thereinto or to allow said handle to be withdrawn therefrom.

4. The improvement of claim 1, wherein said handle is semicircular in configuration so that said handle is self-centering with respect to said second ring member.

5. The improvement of claim 1, wherein said plurality of apertures includes one aperture for each brail line in said cast net, and wherein said apertures are arranged in a circular pattern.

* * * * *